United States Patent [19]

Taga et al.

[11] Patent Number: 4,768,609
[45] Date of Patent: Sep. 6, 1988

[54] FOUR WHEEL DRIVE VEHICLE CENTRAL DIFFERENTIAL TORQUE TRANSFER CONTROL DEVICE AND METHOD LIMITING TORQUE ON FRONT WHEELS OR ON REAR WHEELS

[75] Inventors: Yutaka Taga; Seitoku Kubo, both of Toyota, Japan

[73] Assignee: Toyota Jidosha Kabushiki Kaisha, Aichi, Japan

[21] Appl. No.: 26,271

[22] Filed: Mar. 16, 1987

[30] Foreign Application Priority Data

Mar. 19, 1986 [JP] Japan ................. 61-061799

[51] Int. Cl.⁴ .......................................... B60K 17/34
[52] U.S. Cl. .................................................. 180/249
[58] Field of Search .............. 180/249, 250, 248, 247, 180/243

[56] References Cited

U.S. PATENT DOCUMENTS

| | | | |
|---|---|---|---|
| 4,572,318 | 2/1986 | Cady | 180/248 |
| 4,618,022 | 10/1986 | Hayashi | 180/248 X |
| 4,650,202 | 3/1987 | Tsuzuki | 180/248 |
| 4,671,136 | 6/1987 | Katayama | 180/249 X |
| 4,702,341 | 10/1987 | Taga et al. | 180/249 |

FOREIGN PATENT DOCUMENTS

59-151661 8/1984 Japan .
59-184025 10/1984 Japan .
59-206228 11/1984 Japan .

*Primary Examiner*—John A. Pekar
*Attorney, Agent, or Firm*—Parkhurst & Oliff

[57] ABSTRACT

A four wheel drive power transmission for a vehicle has a center differential device for distributing rotational power supplied from an engine to a front wheel propeller shaft and a rear wheel propeller shaft at a variable torque dividing ratio therebetween, and a mechanism for controlling the center differential device so as to vary the torque dividing ratio according to the magnitude of the torque of the rotational power supplied from the engine so that the torque dividing ratio is varied toward a decreased ratio for one of the front and rear wheel propeller shafts and an increased ratio for the other of the front and rear wheel propeller shafts as the magnitude of torque of the rotational power supplied from the engine increases. The torque loaded on one of the front and rear wheel propeller shafts is maintained not to exceed a determinate value as torque increases.

4 Claims, 3 Drawing Sheets

FIG. 3

FOUR WHEEL DRIVE VEHICLE CENTRAL DIFFERENTIAL TORQUE TRANSFER CONTROL DEVICE AND METHOD LIMITING TORQUE ON FRONT WHEELS OR ON REAR WHEELS

BACKGROUND OF THE INVENTION

The present invention relates to a control method and device for a four wheel drive power transmission system for a vehicle adapted for four wheel drive operation, and more particularly relates to such a control method and device for such a four wheel drive power transmission system, for a vehicle such as an automobile, which includes a torque transfer device for limiting the differential action of a differential device which is provided for distributing power between the front wheels of the vehicle and the rear wheels of the vehicle.

The present invention has been described in Japanese Patent Application Ser. No. Showa 61-061799 (1986), filed by an applicant the same as the entity assigned or owed duty of assignment of the present patent application; and the present patent application hereby incorporates into itself by reference the text of said Japanese Patent Application and the claims and the drawings thereof; a copy is appended to the present application.

Nowadays a greatly increasing number of automotive vehicles are being constructed with four wheel drive transmission systems, because such four wheel drive operation, in which all four wheels of the vehicle are powered from its engine via its transmission, is very suitable for driving on poor or slippery road surfaces such as in mud or over bad ground, or upon roads covered with mud, snow, ice, or rain. In other words, four wheel drive operation provides a much higher degree of stability and drivability for the vehicle in conditions where the coefficient of friction between the wheels and the surface upon which the vehicle is riding is relatively low. Also, four wheel driver operation is beneficial for aiding with hill climbing characteristics and high speed stability characteristics. Therefore, the so called full time four wheel drive type of transmission, which remains always engaged to four wheel drive without any episodes of two wheel driving, is becoming more and more popular.

In such a four wheel drive transmission system for an automotive vehicle, it is usual to provide a center differential device for distributing rotational power between the front wheels of the vehicle and the rear wheels of the vehicle, as well as the per se conventional rear differential device that provides differential action between the two rear vehicle wheels and the also per se conventional front differential device that provides differential action between the two front vehicle wheels. Such a central or front—rear differential device is provided in order to provide a differential action between said front vehicle wheels (considered as a pair) and said rear vehicle wheels (also considered as a pair) when the vehicle is turning around a curve, in order to eliminate the possibility of the occurrence of the so called tight corner braking phenomenon created by the difference in the turning radiuses of the front wheels of the vehicle and the rear wheels thereof (and also for various other reasons). And such provision of such a central or front—rear differential device is effective for achieving this result. However, a problem that arises with such provision of such a central or front—rear differential device is that, if at any time even one only of the four vehicle wheels should break away from the road surface and should start to spin, then no drive power or at least severely reduced drive power is provided to the other three vehicle wheels. This type of problem is particularly likely to arise in the event that the road conditions are poor due to rain, snow, dust, dirt, or the like which deteriorate the coefficient of the vehicle wheels on the road surface, and thereby vehicle drivability can be severely reduced.

In order to counteract this effect, it has been practiced to provide a device to such a front—rear differential device which prevents or which impedes (i.e. partially prevents) said front—rear differential device from performing differential action, in a selective fashion. When such a center differential action inhibition means, which typically may be a hydraulic clutch or a hydraulic brake, is actuated, it causes the differential action provided by said front—rear differential device between the front vehicle wheels and the rear vehicle wheels to be prevented or at any rate impeded, and instead said front vehicle wheels, considered as a pair, are driven from the vehicle engine via the front differential device, and also said rear vehicle wheels, considered as a pair, are similarly independently driven from said vehicle engine, similarly via the rear differential device. Thereby, the problem outlined above, of loss of power to the other three vehicle wheels when one of the vehicle wheels starts to spin, is obviated. Such types of structure are disclosed, for example, in Japanese Patent Application Laying Open Publication Ser. No. 59-184025 (1984), Japanese Patent Application Laying Open Publication Ser. No. 59-151661 (1984), and Japanese Patent Application Laying Open Publication Ser. No. 59-206228 (1984), none of which is it intended hereby to admit as prior art to the present patent application except to the extent in any case required by applicable law.

The following type of problem, however, can tend to arise in a vehicle incorporating such a front—rear differential device fitted with such a differential action inhibiting means. There has always been the possibility that said front—rear differential device could become completely locked up, so that it totally failed to provide any differential action at all between the front vehicle wheels considered as a pair and the rear vehicle wheels considered as a pair, as a result of the clutch or brake therein locking up securely, and in such a case there would be a possibility of all of the torque supplied by the engine of the vehicle being transmitted to the rear wheels of the vehicle only, of course via the rear differential device, or to the front wheels of the vehicle only, similarly of course via the front differential device. This problem has been recognized in the past, and in order to cope with its effects it has been necessary, and has been practiced, to construct the front differential device to have such a high torque transmission capacity that it can cope by itself with transmitting all of the torque supplied by the engine of the vehicle; and, similarly, it has been necessary and has been practiced to construct the rear differential device to have a similarly high torque transmission capacity, so that it also can cope by itself with transmitting all of the torque supplied by said engine of said vehicle. As a consequence, both the front differential device and also the rear differential device of the vehicle have been required to be made rather large, which not only has increased their cost and their weight, but also by increasing their size has reduced the ground clearance of the vehicle, for the same suspension construction thereof.

SUMMARY OF THE INVENTION

The inventors of the present invention have considered the various problems detailed above in the aforementioned type of four wheel drive type vehicle incorporating such a four wheel drive power transmission system fitted with such a center differential action inhibition means.

Accordingly, it is the primary object of the present invention to provide an improved torque transfer control method for a four wheel drive type vehicle, and a corresponding device for implementing said method, of the general type described above, which avoid the problems detailed above.

It is a further object of the present invention to provide such a torque transfer control method and device, which do not entail inhibiting the action of the front—rear differential device to a greater extent than necessary.

It is a further object of the present invention to provide such a torque transfer control method and device, which do not entail ever transmitting the whole of the torque which is produced by the vehicle engine to the front wheels of the vehicle by themselves, or to the rear wheels of the vehicle by themselves.

It is a further object of the present invention to provide such a torque transfer control method and device, the utilization of which ensures that it is not required to design either the front differential device for the vehicle or the rear differential device for the vehicle to be able to sustain by itself the whole of the maximum value of the torque which can be produced by the vehicle engine.

It is a further object of the present invention to provide such a torque transfer control method and device, which maximize the durability of the front and rear differential devices fitted to the vehicle.

It is a further object of the present invention to provide such a torque transfer control method and device, which maximize the durability of propeller shaft assemblies which drive such front and rear differential devices of the vehicle.

It is a yet further object of the present invention to provide such a torque transfer control method and device, which allows the differential device for the front and/or the rear wheels of the vehicle to be light in weight.

It is a yet further object of the present invention to provide such a torque transfer control method and device, which allows the differential device for the front and/or the rear wheels of the vehicle to be compact.

It is a yet further object of the present invention to provide such a torque transfer control method and device, which allow vehicle ground clearance to be maximal.

It is a yet further object of the present invention to provide such a torque transfer control method and device, which are particularly effective, in the case that the vehicle front—rear differential device is of an unequal distribution type which distributes drive torque substantially unequally between the front vehicle wheels and the rear vehicle wheels.

It is a yet further object of the present invention to provide such a torque transfer control method and device, which allows the vehicle as a whole to be of low cost.

According to the most general device aspect of the present invention, these and other objects are attained by, for a four wheel drive power transmission system for a vehicle with two front wheels, two rear wheels, and an engine, comprising a power distribution device for four wheel drive which receives rotational power from said engine and which provides said rotational power to the combination of the front wheels of said vehicle and also to the combination of the rear wheels of said vehicle, said power distribution device for four wheel drive being controllable to so as to vary its distribution of torque between said combination of said front wheels of said vehicle and said combination of said rear wheels of said vehicle: a torque transfer control device, comprising: (a) a means for determining a desired value for said distribution of torque between said combination of said front wheels of said vehicle and said combination of said rear wheels of said vehicle, provided by said power distribution device for four wheel drive, so as to keep the torque applied to one of said combination of said front wheels of said vehicle and said combination of said rear wheels of said vehicle less than a determinate value; and: (b) a means for controlling said power distribution device for four wheel drive to provide distribution of torque between said combination of said front wheels of said vehicle and said combination of said rear wheels of said vehicle, according to said desired distribution; and, according to the most general method aspect of the present invention, these and other objects are attained by, for a four wheel drive power transmission system for a vehicle with two front wheels, two rear wheels, and an engine, comprising a power distribution device for four wheel drive which receives rotational power from said engine and which provides said rotational power to the combination of the front wheels of said vehicle and also to the combination of the rear wheels of said vehicle, said power distribution device for four wheel drive being controllable to so as to vary its distribution of torque between said combination of said front wheels of said vehicle and said combination of said rear wheels of said vehicle: a torque transfer control method, wherein: (a) a desired value is determined for said distribution of torque between said combination of said front wheels of said vehicle and said combination of said rear wheels of said vehicle, provided by said power distribution device for four wheel drive, so as to keep the torque applied to one of said combination of said front wheels of said vehicle and said combination of said rear wheels of said vehicle less than a determinate value; and: (b) said power distribution device for four wheel drive is controlled to provide distribution of torque between said combination of said front wheels of said vehicle and said combination of said rear wheels of said vehicle, according to said desired distribution.

Further, according to a particular device specialization of the present invention, the above specified and other objects may be more particularly attained by a torque transfer control device as described above, wherein said means for determining said desired torque distribution value is a means for so doing according to the value of the torque input to said power distribution device for four wheel drive from said engine. And, further, said means for determining said desired torque distribution value between said combination of said front wheels of said vehicle and said combination of said rear wheels of said vehicle may be for so doing so as to keep the torque applied to said combination of said front wheels of said vehicle less than said determinate value.

And said means for determining said desired torque distribution value according to the value of the torque input to said power distribution device for four wheel drive from said engine may be a means for so doing in a monotonically decreasing manner, and optionally but desirably may be a means for so doing in a substantially monotonically decreasing linear manner. Likewise, according to a particular method specialization of the present invention, the above specified and other objects may be more particularly attained by a torque transfer control method as described above, wherein said desired torque distribution value is determined according to the value of the torque input to said power distribution device for four wheel drive from said engine. And, further, said desired torque distribution value between said combination of said front wheels of said vehicle and said combination of said rear wheels of said vehicle may be determined so as to keep the torque applied to said combination of said front wheels of said vehicle less than said determinate value, and may be determined according to the value of the torque input to said power distribution device for four wheel drive from said engine in a monotonically decreasing manner—optionally but desirably, a substantially monotonically decreasing linear manner.

According to such a device and method, since the torque applied to at least one of said combination of said front wheels of said vehicle and said combination of said rear wheels of said vehicle is always definitely maintained to be less than said determinate value, thereby the durability of the differential device for said front wheels of said vehicle or for said rear wheels of said vehicle is enhanced, and the durability of any propeller shaft assembly therefor is also enhanced. Further, such a front or rear differential device can be manufactured less robustly than would otherwise be necessitated, since it is not required for said differential device to be able to sustain by itself the whole of the maximum value of the torque which can be produced by the vehicle engine. Thereby, such a front or rear differential device can be light in weight, and can be compact, thus enhancing vehicle ground clearance and reducing the cost of the vehicle as a whole.

BRIEF DESCRIPTION OF THE DRAWINGS

The present invention will now be described with respect to the preferred embodiments of the device and of the method thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and flow chart steps and so on in the various figures; and:

DESCRIPTION OF THE PREFERRED EMBODIMENT

The present invention will now be described with reference to the preferred embodiments of the device and of the method thereof, and with reference to the figures.

Overall Vehicle Power Train Structure

Figure 1:
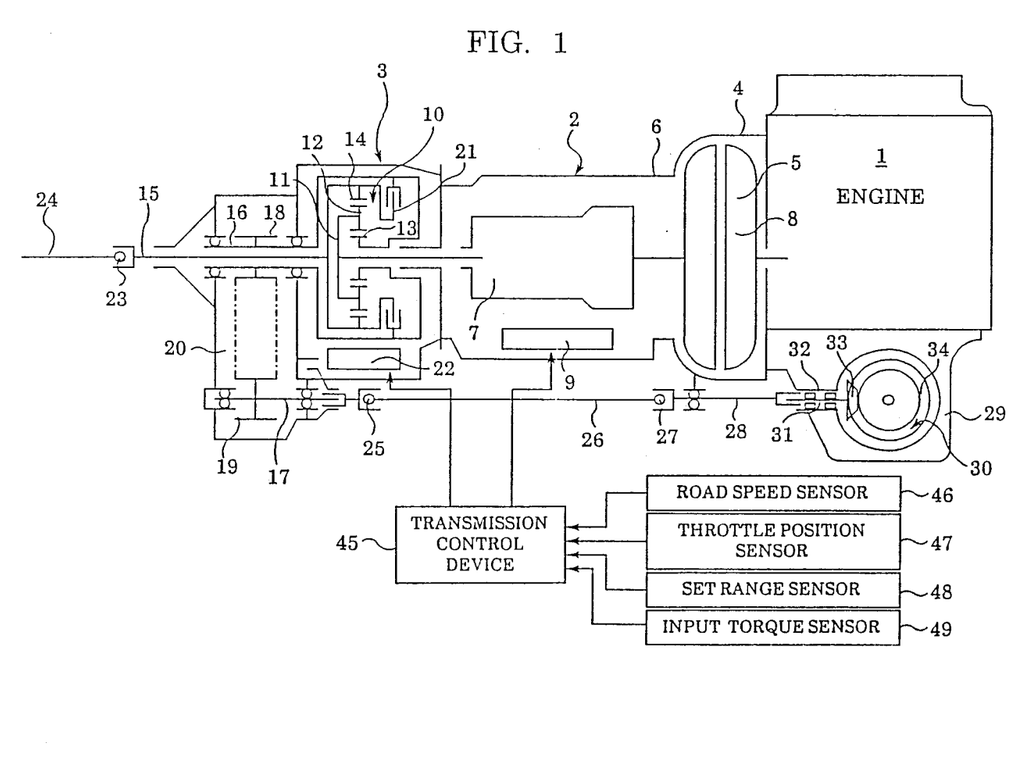
FIG. 1 is a schematic longitudinal skeleton view of a vehicle power train and of a control system therefor which incorporates the preferred embodiment of the torque transfer control device of the present invention, for practicing the preferred method embodiment.

FIG. 1 is a schematic longitudinal skeleton view of a power train of a vehicle, which incorporates the preferred embodiment of the four wheel drive torque transfer control device of the present invention, said device performing the preferred method embodiment. In this figure, the reference numeral 1 denotes an internal combustion engine of the vehicle, which is mounted, in this exemplary case, longitudinally in the front engine room (not particularly shown) of said vehicle. And the reference numeral 2 denotes an automatic speed change device (automatic transmission) of a per se known type, while 3 denotes a four wheel drive power transfer device which is always operating in so called full time four wheel drive mode, so as always to drive both the rear pair of wheels of the vehicle and also the front pair of wheels of the vehicle, albeit with the differential action provided by this four wheel drive power transfer device 3 being selectably either provided or not provided, as will be explained in detail hereinafter.

In more detail, the automatic speed change device 2 incorporates a fluid torque converter 5 of a per se known construction, and the power input shaft of this fluid torque converter 5 is connected to and receives rotational power from a crank shaft of the internal combustion engine 1. And the fluid torque converter 5 is housed within a torque converter housing 4 fitted against and secured to the main body of the internal combustion engine 1, while the automatic speed change device 2 comprises a gear transmission mechanism 7, which is likewise housed within a speed change device housing 6 fitted against and secured to the torque converter housing 4. And the input shaft of the gear transmission mechanism 7 is connected to and receives rotational power from the power output shaft of the fluid torque converter 5; and thereby the gear transmission mechanism 7 receives rotational power from the internal combustion engine 1, with a certain degree of slippage and also torque amplification being provided for said rotational power by the fluid torque converter 5 (unless a lock up clutch thereof, if provided thereto, is activated) as is per se conventional. This gear transmission mechanism 7 may for the purposes of this specification be of a per se known type incorporating various planetary gear mechanisms and friction engaging mechanisms such as clutches and brakes, and, according to selective actuation of said friction engaging mechanisms providing by an electrically controlled electric/hydraulic control mechanism 9 of a per se known sort including various speed change solenoids and so on, provides any one of a plurality of speed reduction stages between its said power input shaft and its power output shaft, its said power output shaft driving the four wheel drive power transfer device 3.

This four wheel drive power transfer device 3 incorporates a center differential device 10 of a planetary gear wheel type for providing full time differential action between the front wheels of the vehicle and the rear wheels of the vehicle during the full time four wheel drive operation thereof. Now the detailed construction of this center differential device 10 will be explained. It comprises a sun gear 13, a ring gear 14, a carrier 11, and a plurality of planetary pinions 12 rotatably mounted to said carrier 11 and meshed between the sun gear 13 and the ring gear 14 and performing planetary movement between them in a per se known manner. The carrier 11 functions as an input member for this center differential device 10, and is rotationally connected to the output shaft of the gear transmission mechanism 7 via a shaft which passes through the central axis of the hollow sun gear 13. The ring gear 14 functions as one power output member for the center differential device 10 for supplying power to the rear wheels of the vehicle, and is rotationally connected to a rear wheel power output shaft 15 which extends out of the four wheel drive power transfer device 3 in the direction to the left as seen in FIG. 1, i.e. towards the rear of the vehicle in this particular exemplary implementation. And the sun gear 13 functions as another power output member for the center differential device 10 for supplying power to the front wheels of the vehicle, and is rotationally connected to a sleeve shaped intermediate front wheel drive shaft 16 via a drum member fitted around the planetary gear mechanism as a whole. This intermediate front wheel drive shaft 16 is hollow and is fitted around the portion of the rear wheel power output shaft 15 within the housing of this four wheel drive power transfer device 3, and on its outside there is fixedly mounted a sprocket wheel 18. An endless chain 20 is fitted around this sprocket wheel 18 and also around another sprocket wheel 19 provided below said sprocket wheel 18, from the point of view of the figure and in the actual vehicle body also, and with its central axis parallel to the central axis of said sprocket wheel 18. The sprocket wheel 19 is fixedly mounted on a front wheel power output shaft 17, one end of which protrudes from the housing of this four wheel drive power transfer device 3 in the leftwards direction in the figure, i.e. towards the front end of the vehicle in this particular exemplary implementation.

Thus, the power distribution ratio (drive torque distribution) between the intermediate front wheel drive shaft 16 and the rear wheel power output shaft 15, when this four wheel drive power transfer device 3 is operating freely (i.e. a clutch 21 to be described shortly is in the released condition), is determined by the relative tooth counts of the sun gear 13 and the ring gear 14 in the following manner:

$Rr = 1/(1 + Rg)$ $Rf = Rg(1 + Rg)$ where:
Rr is the rear wheel distribution ratio;
Rf is the front wheel distribution ratio; and
Rg is the ratio of the number of teeth on the sun gear 13 to the number of teeth on the ring gear 14.

Because the number of teeth on the sun gear 13 is naturally greater than the number of teeth on the ring gear 14, thus, providing that the number of teeth on the sprocket wheel 18 and the number of teeth on the sprocket wheel 20 are the same, this four wheel drive power transfer device 3 is of the type which distributes a larger amount of torque to the rear vehicle wheels than to the front vehicle wheels. Typically, in a typical implementation, the ratio of distribution of torque between the front wheels and the rear wheels will be of the order of 3:7 to 4:6, and thus, when as described later the clutch 21 is fully released, typically the center differential device 10 will distribute about 60% to 70% of the torque input to it to the rear vehicle wheels, while it distributes only about 30% to 40% of the torque input to it to the front vehicle wheels.

Thus, within the four wheel drive power transfer device 3 there is provided a hydraulically operated wet type clutch 21, which selectively rotationally connects together the sun gear 13 and the ring gear 14, either completely or partially as will be explained shortly, or alternatively allows said members to rotate freely with respect to one another. This wet clutch 21 is selectively operated by supply of actuating hydraulic fluid pressure from an electrically actuated electric/hydraulic control device 22. Accordingly, the four wheel drive power transfer device 3, which receives rotational power input from the gear transmission mechanism 7 and outputs said rotational power to the rear wheel power output shaft 15 and to the front wheel power output shaft 17, can be caused either to provide differential action for distributing said rotational power between said rear wheel power output shaft 15 and said front wheel power output shaft 17, or not to provide any such differential action and just to drive said shafts 15 and 17 independently, or to provide a condition intermediate between these two extreme conditions, so as to partly allow the center differential device 10 to provide its differential action for distributing said rotational power between said rear wheel power output shaft 15 and said front wheel power output shaft 17, to some extent while being impeded by the dragging action of the clutch 21.

Via a universal joint 23 of a per se known sort, the rear end of the rear wheel power output shaft 15 rotationally drives the front end of a rear wheel propeller shaft 24. And the rear end of this rear wheel propeller shaft 24 is connected via another universal joint (not particularly shown) to a differential device, (not particularly shown either), for driving the rear wheels (also not shown) of the vehicle.

And, via a universal joint 25 also of a per se known sort, the front end of the front wheel power output shaft 17 rotationally drives the rear end of a front wheel propeller shaft 26. Thus, this front wheel propeller shaft 26 extends alongside and generally below the automatic speed change device 2 including the fluid torque converter 5 therein, roughly parallel to the longitudinal axis thereof and on one side thereof. The front end of this front wheel propeller shaft 26 is rotationally connected, via another universal joint 27 also of a per se known sort, to the outer end of a drive pinion shaft 28 which constitutes the power input shaft of a front differential device 30 which drives the front wheels (not shown) of the vehicle, and the outer end of which is supported from the torque converter casing 4 by means of a bearing assembly. And this drive pinion shaft 28 is also rotatably supported at its intermediate portion from the casing 32 of the front differential device 30 (this casing 32 is integrally formed with the oil pan 29 of the internal combustion engine 1), and the inner end of this drive pinion shaft 28 is provided with a drive pinion 33 which is constituted as a bevel gear, with said drive pinion 33 being meshingly engaged with a driven ring gear 34 of the front differential device 30.

Operation of this Power Train

This vehicle power train operates as follows. When the clutch 21 of the four wheel drive power transfer device 3 is operated by the electrically actuated electric/hydraulic control device 22 so as not at all to rotationally connect together the sun gear 13 and the ring gear 14, then the center differential device 10 functions so as to provide its differential effect between the rear wheel power output shaft 15 and the intermediate front wheel drive shaft 17 in full measure, i.e. so as to receive rotational power provided by the engine 1 of the vehicle and transmitted to said four wheel drive power transfer device 3 via the automatic speed change device 2, and to distribute said rotational power, while providing a non damped differential effect, between the rear wheels of the vehicle taken as a combination and the front wheels of the vehicle taken as a combination. Accordingly, in this case, the power distribution (torque distribution) ratio between the front wheels of the vehicle and the rear wheels of the vehicle is determined, when the four wheel drive power transfer device 3 is operating in the above mode, by the ratio of the tooth counts of the sun gear 11 and the ring gear 12, as explained above. On the other hand, when the clutch 21 of the four wheel drive power transfer device 3 is operated by the electrically actuated electric/hydraulic control device 22 so as to completely rotationally connect together the sun gear 13 and the ring gear 14, i.e. so as to provide an effectively unlimited degree of torque transmission, then the center differential device 10 functions so as to provide no such differential effect at all between the rear wheel power output shaft 13 and the intermediate front wheel drive shaft 14, i.e. so as to distribute the rotational power provided from the engine 1 via the automatic speed change device 2 directly to the rear wheels 24 of the vehicle taken as a combination and also to the front wheels 28 of the vehicle taken as a combination in an even fashion without any provision of any differential effect at all. And, in the intermediate case between these two extremes, when said clutch 21 of said four wheel drive power transfer device 3 is operated by said electrically actuated electric/hydraulic control device 22 so as somewhat to rotationally connect together said sun gear 13 and said ring gear 14, i.e. so as to provide a certain degree of dragging or torque transmitting effect between these members, then said center differential device 10 functions so as to provide its differential effect between said rear wheel power output shaft 15 and said intermediate front wheel drive shaft 17 to a partial degree, i.e. so as to receive rotational power provided by said engine 1 of said vehicle and transmitted to said four wheel drive power transfer device 3 via said automatic speed change device 2, and to distribute said rotational power, while providing a partially damped differential effect, between said rear wheels of said vehicle taken as a combination and said front wheels of said vehicle taken as a combination.

The Construction of the Central Differential Control Clutch 21 and of the Electrically Actuated Electric/Hydraulic Control Device 22

Figure 2:
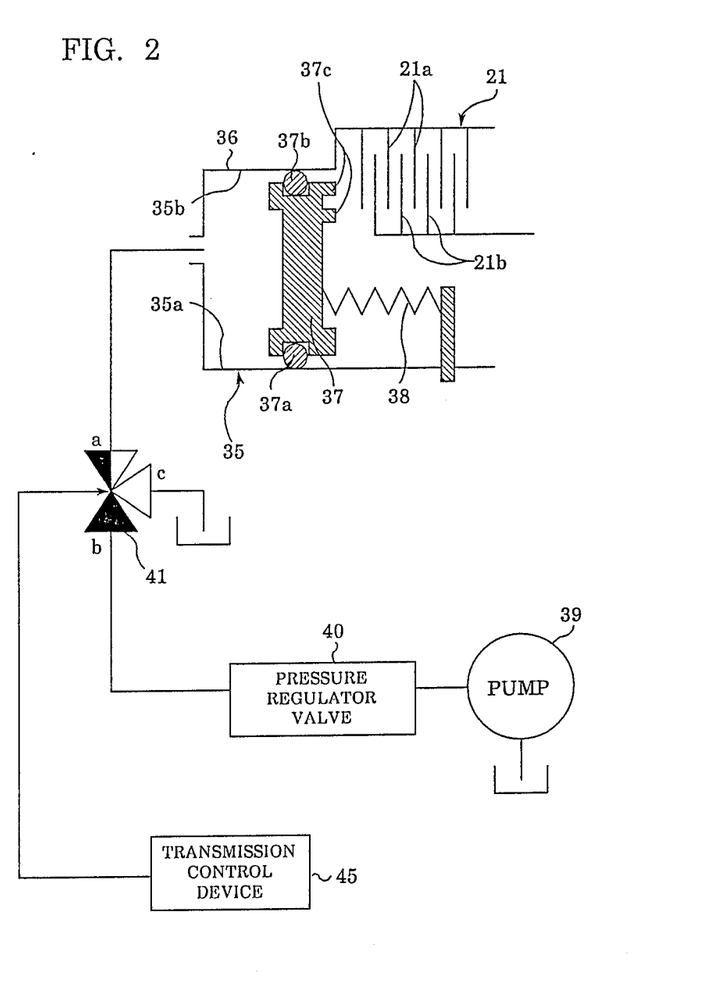
FIG. 2 is a schematic partial sectional view of a torque transfer clutch which is provided to a center differential device of the FIG. 1 power train, and also in partial block diagrammatical view shows a control system therefor.

In FIG. 2, there is shown a schematic cross sectional view of the central differential control clutch 21 and a schematic block diagram of a possible embodiment of an actuating system for it, suitable for providing the function of the electrically actuated electric/hydraulic control device 22; however, this particular arrangement should not be taken as limitative of the present invention, as other possibilities for these structures could also be implemented, in alternative embodiments. In FIG. 2, the cross section of this central differential control clutch 21 is only partially shown, since this clutch 21 and the structures associated with it are circularly symmetrical about the central axis of the center differential device 10, and are generally formed in a toroidal shape.

In this figure, the central differential control clutch 21 is shown as having two sets of clutch plates 21a and 21b which are mutually interleaved in a sandwiched arrangement. One of these sets set 21a or 21b of these clutch plates is rotationally connected to the sun gear 13 of the center differential device 10, while the other one of these sets 21a or 21b of these clutch plates is rotationally connected to the ring gear 14 of said center differential device 10; these arrangements are not particularly shown in FIG. 2. Thus, when the sets 21a and 21b of clutch plates are squeezed together, torque transmission between the sun gear 13 and the ring gear 14 of the center differential device 10 is provided in a degree corresponding to the degree of squeezing together of said sets 21a and 21b of clutch plates.

A servo device 35 is provided for thus pressing and squeezing together said sets 21a and 21b of clutch plates, and comprises an inner cylindrical bore 35a and an outer cylindrical bore 35b, between which there is defined a toroidal pressure chamber 36; these inner and outer cylindrical bores 35a and 35b are formed in a member which is rotationally connected to the set 21a of clutch plates, i.e. which is rotationally connected to the one or the other of the sun gear 13 and the ring gear 14 to which said set 21a of clutch plates is fitted. Within and between said inner and outer cylindrical bores 35a and 35b there is fitted a toroidal piston member 37 which slidingly cooperates with said inner and outer cylindrical bores 35a and 35b via respective seal members 37a and 37b. A pair of annular projections 37c are provided on the side of this piston member 37 which confronts the sandwiched together sets 21a and 21b of clutch plates, for opposing said clutch plate sets 21a and 21b and for pressing them together, when the piston member 37 is biased in their direction. And the other side of the piston member 37 serves for defining the pressure chamber 36, in cooperation with the inner and outer cylinder bores 35a and 35b. A spring 38 (which in fact is an annular spring) is provided for biasing the piston member 37 in the leftwards direction as seen in FIG. 2, so as to reduce the size of the pressure chamber 36. Thereby, when no substantial pressure is supplied to said pressure chamber 36, under the biasing action of the spring 38 the piston member 37 is biased in the leftwards direction as seen in the drawing, so as to not substantially compress the superposed sandwich of the clutch plate sets 21a and 21b and thus to let said clutch plate sets 21a and 21b be not substantially mutually engaged; and, thereby, no substantial degree of torque transmission between the sun gear 13 and the ring gear 14 of the center differential device 10 is provided. On the other hand, when a substantial degree of pressure is supplied to the pressure chamber 36, the piston member 37 is biased, against the biasing action of the spring 38 which is overcome, in the rightwards direction as seen in the drawing, so that the pair of annular projections 37c of said piston member 37 press against and compress the superposed sandwich of the clutch plate sets 21a and 21b with a force determined according to the magnitude of the pressure value supplied to the pressure chamber 36, thereby causing said clutch plate sets 21a and 21b to be mutually engaged together with a torque transmission capability determined according to said magnitude of said pressure value supplied to said pressure chamber 36; and, thereby, torque transmission between the sun gear 13 and the ring gear 14 of the center differential device 10 is provided, similarly with a magnitude determined according to the magnitude of the pressure value supplied to the pressure chamber 36.

Arrangements are provided for supplying a hydraulic fluid pressure of any desired pressure level from substantially zero up to line pressure to the pressure chamber 36 of this servo device 35, according to the value of an electrical control signal supplied, thus embodying the functions of the electrically actuated electric/hydraulic control device 22, as follows. A hydraulic fluid pump picks up a steady supply of hydraulic fluid from a sump and pressurizes it. This pressurized hydraulic fluid is then supplied to a pressure regulator valve 40, which regulates its pressure to a standard or line hydraulic pressure value. This standardized hydraulic pressure is then supplied to a port designated as "b" of an electromagnetically actuated hydraulic switching valve 41, which further has two other ports designated as "a" and "c". The port "a" is communicated via a hydraulic fluid conduit to the pressure chamber 36 of the servo device 35, while the port "c" is connected to a hydraulic fluid drain. And this electromagnetically actuated hydraulic switching valve 41, which is of a per se known construction, incorporates a solenoid valve or a like electrical means not particularly shown, and is so constituted that: when no actuating electrical energy is supplied to said solenoid valve or the like of said electromagnetically actuated hydraulic switching valve 41, it communicates together its port "a" and its port "c" while isolating its port "b" and communicating it to no other of its ports—while , on the other hand, when actuating electrical energy is supplied to said solenoid valve or the like of said electromagnetically actuated hydraulic switching valve 41, it communicates together its port "a" and its port "b" while isolating its port "c" and communicating it to no other of its ports. Accordingly, by supplying a pulse type actuating electrical signal to said electromagnetically actuated hydraulic switching valve 41 of the appropriate duty ratio, it is possible communicates together the port "a" thereof and, alternatingly, the port "b" and the port "c" thereof at a corresponding duty ratio, thus maintaining a pressure in the pressure chamber 36 which is attenuated from the standard pressure which is being supplied by the pressure regulator valve 40 by an amount corresponding to the duty ratio of said pulse electrical signal supplied. Thereby, by varying the duty ratio of said pulse electrical signal, it is possible to vary the degree of torque transmission between the sun gear 13 and the ring gear 14 of the center differential device 10 between substantially zero and a substantially maximum value. This controlling pulse electrical signal is supplied from a transmission control device 45, now to be explained.

Transmission Control System

Referring to FIG. 1, it will be seen that the following detectors and sensors are provided to this system. A road speed sensor 46 detects a value representative of the road speed of the vehicle by measuring the rotational speed of the rear wheel power output shaft 15, and outputs an electrical signal representative thereof. A throttle position sensor 47 detects a value representative of the current load on the internal combustion engine 1 by measuring the opening angle of the throttle valve (not particularly shown) of a carburetor (not shown either) of said engine 1, and outputs an electrical signal representative thereof. A set range sensor 48 detects the set position of a manual range setting valve which is provided for the transmission mechanism 2, or of a setting means therefor, and outputs an electrical signal representative thereof; this manual range setting valve is not particularly shown in the figures, but said setting means therefor is provided in the passenger compartment of the vehicle so as to be readily accessible to the driver of the vehicle, and can be set to any one of a number of set positions corresponding to various operational ranges for the transmission mechanism 2 such as "D" range, "2" range, "L" range, "R" range, "N" range, and "P" range. And an input torque sensor 49 senses the input torque (hereinafter designated as "Ti") input to the four wheel drive power transfer device 3 from the automatic speed change device 2, and outputs an electrical signal representative thereof. The output signals of these four sensors and switches 46, 47, 48, and 49 are fed to a transmission control device 45.

This transmission control device 45 outputs control signals for controlling the electric/hydraulic control device 22 for the four wheel drive power transfer device 3 and the electrical/hydraulic control mechanism 9 for the gear transmission mechanism 7, according to principles which incorporate the concept of the torque transfer control device and method of the present invention, as will now be explained. No concrete illustration of the structure of any particular realization of the transmission control device 45 will be given herein, and nor will any particular details be elaborated as to how it accomplishes those of its functions which will hereinafter be specified, since various possibilities for the details thereof can be easily supplemented by one of ordinary skill in the electronic and computer programming art based upon the functional disclosures set out in this specification. In the preferred embodiments of the device and the method of the present invention, the transmission control device 45 is concretely realized as a micro computer and its associated circuitry, said micro computer operating at the behest of a control program, not to be particularly detailed herein. However, it should be particularly understood that such realizations in the micro computer form, although preferred, are not the only ways in which the transmission control device 45 can be provided; in other possible embodiments it could be constituted as an electrical device not incorporating a microprocessor, or indeed it could be a purely hydraulic device. In the preferred case, however, such a microprocessor will typically comprise: a CPU (central processing unit) which obeys said control program to be described shortly and which inputs data, performs calculations, and outputs data; a ROM (read only memory) which stores said program to be described shortly and initialization data therefor and so on; and a RAM (random access memory) which stores the results of certain intermediate calculations and data and so on; and these devices together will constitute a logical calculation circuit, being joined together by a common bus which also links them to an input port and an output port which together perform input and output for the system. And the system will typically also include buffers for the electrical signals outputted from the various sensors and switches 46 through 40 to the input port device, and drive circuits through which actuating electrical signals are passed from the output port device to a speed change control solenoid or solenoids of the electrical/hydraulic control mechanism 9 for controlling the automatic speed change device 2 and to a control solenoid such as one incorporated in the electromagnetically actuated hydraulic switching valve 41 described earlier of the electric/hydraulic control device 22 for controlling the torque transmission capacity (hereinafter designated as "Tc") of the clutch 21 of the four wheel drive power transfer device 3. Thus, this actuating signal for the electrically actuated electric/hydraulic control device 22, thus outputted by the transmission control device 45, would be a pulse type electrical signal.

It should be understood that the transmission control device 45 generally functions so as to engage an appropriate one of the various speed stages of the gear transmission mechanism 7 of the transmission mechanism 2 according to the current values of various vehicle operating parameters such as the vehicle road speed as sensed by the vehicle road speed sensor 46, the engine load (throttle opening) as sensed by the throttle position sensor 47, and the operating range of the transmission as manually set by the vehicle driver on the setting means therefor as sensed by the set range sensor 48; such a function may be performed in a per se conventional way, and no particular details thereof will be shown or suggested in this specification, since various possibilities for the details thereof can be easily supplemented as appropriate by one of ordinary skill in the transmission control and the programming arts, particularly when based upon the functional disclosures set out in this specification. Thus, only the portion of the function of the transmission control device 45 for controlling the clutch 21 of the center differential device 10 of the four wheel drive power transfer device 3, i.e. only the torque transfer control provided by the transmission control device 45, will be considered herein.

Figure 3:
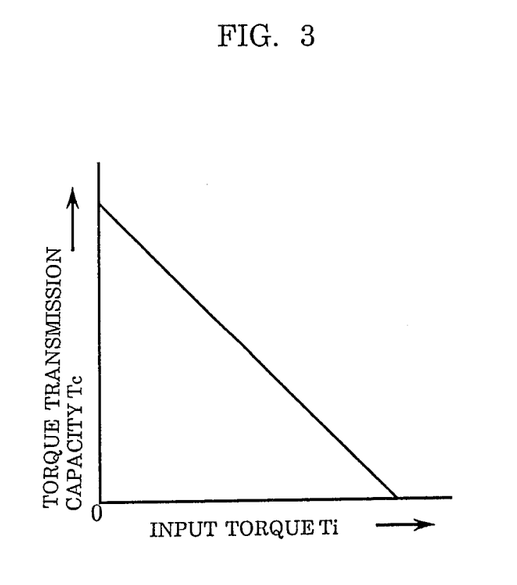
FIG. 3 is a graph, in which torque Ti input to said center differential device is shown along the horizontal axis and torque transfer capacity Tc which said torque transfer clutch is controlled to provide is shown along the vertical axis, for explaining the principle of control which is the nub of the present invention.

According to this torque transfer control device and method of the present invention, the torque transmission capacity Tc of the clutch 21 of the center differential device 10 of the four wheel drive power transfer device 3 is controlled, via the electrically actuated electric/hydraulic control device 22, as shown in the FIG. 3 graph (which is however only exemplary, although preferred), according to the value of the input torque Ti input to said four wheel drive power transfer device 3 from the automatic speed change device 2. In other words, as said torque Ti input to said four wheel drive power transfer device 3 increases, the transmission control device 45 controls the torque transmission capacity Tc of the clutch 21 of the center differential device 10 to decrease it. And, in these preferred embodiments of the torque transfer control device and method of the present invention, the relationship between said torque Ti input to said four wheel drive power transfer device 3 and said torque transmission capacity Tc of the clutch 21 is controlled by the transmission control device 45 to be a substantially linear and monotonically decreasing relationship.

Now, when the transmission control device 45 is outputting a signal to the electric/hydraulic control device 22 to cause said electric/hydraulic control device 22 to fully engage the clutch 21 of the center differential device 10 of the four wheel drive power transfer device 3, so as definitely to rotationally couple together the sun gear 13 and the ring gear 14 of said center differential device 10, and so as therefore to positively prevent said center differential device 10 from performing its differential action between the front vehicle wheels and the rear vehicle wheels, then the front vehicle wheels and the rear vehicle wheels are both directly driven from the engine 100 without any differential action occurring therebetween; and in this case the torque distribution ratio between the front and the rear wheels is 1:1 (as long as no slippage of either the front vehicle wheels or the rear vehicle wheels on the surface of the road is occurring). Thus, in this case, the amounts of drive torque supplied to the front vehicle wheels and to the rear vehicle wheels are substantially equal, in the case of the shown exemplary power train of FIG. 1 in which the numbers of teeth on the sprocket wheel 18 and the sprocket wheel 20 and the reduction ratios of the front and the rear differential devices and so on are such as to provide substantially the same reduction ratio between the rear wheel power output shaft 15 and the rear vehicle wheels, as between the intermediate front wheel drive shaft 16 and the front vehicle wheels. This 1:1 torque distribution ratio will prevail, irrespective of the number of teeth on the sun gear 13 and the ring gear 14, i.e. irrespective of the actual value of torque distribution ratio which would be provided by the center differential device 10 if it were being allowed to provide its differential action. On the other hand, when the transmission control device 45 is outputting a signal to the electric/hydraulic control device 22 to cause said electric/hydraulic control device 22 not to engage the clutch 21 of the center differential device 10 of the four wheel drive power transfer device 3 at all, so as not to rotationally couple together the sun gear 13 and the ring gear 14 of said center differential device 10, so as therefore to allow said center differential device 10 substantially completely freely to perform its differential action between the front vehicle wheels and the rear vehicle wheels, to thus drive said front vehicle wheels and said rear vehicle wheels from the engine 1 while distributing rotational power and torque between them with substantially freely provided differential action, then in this case the amount of drive torque supplied to the front vehicle wheels is, as mentioned above, substantially less than the amount of drive torque supplied to the rear vehicle wheels, again in the case of the shown exemplary power train of FIG. 1, by a ratio typically of the order of 3:7 to 4:6, as explained earlier in this specification. Thus, as compared to the case in which the clutch 21 of the center differential device 10 is being fully engaged by the action of the transmission control device 45 via the electrically actuated electric/hydraulic control device 22, when said clutch 21 is in the fully disengaged condition the proportion of torque that is supplied to the front vehicle wheels is lower, and the strain imposed upon the front differential device 30 is accordingly lower. And, when the clutch 21 of the center differential device 10 is only partially disengaged to an amount midway between the above described two extremes, then said center differential device 10 will provide its differential action to a partial extent, thus reducing the proportion of torque that is supplied to the front vehicle wheels, and the strain imposed upon the front differential device 30, to a lesser extent than in the full disengagement case described above.

As described above, if the torque transfer capacity Tc of the clutch 21 of the center differential device 10 is reduced according to increase of the torque Ti input to said center differential device 10, as illustrated in FIG. 3, then the amount of torque which is distributed to the front wheels of the vehicle will not exceed a determinate maximum value. Under these conditions, it is considered to be desirable for the torque transfer capacity Tc to be set so as to satisfy the formula:

$$Tf = (p/(1+p)Ti + Tc) \leq Tmax$$

so that Tc should be $\leq Tmax - (p/(1+p)Ti)$ where Tf is the torque which is supplied to the front wheels of the vehicle, p is the ratio of the number of teeth on the ring gear 14 to the number of teeth on the sun gear 13, and Tmax is the maximum torque that it is considered to be appropriate to supply to the front wheels of the vehicle, i.e. the maximum value for Tf which is considered to be acceptable.

Thus, as explained above, by ensuring that the maximum torque that is supplied to the front wheels of the vehicle does not exceed the determinate value Tmax thereof, it is positively ensured that the front differential device 30 is not imposed with any torque load greater than a corresponding determinate value. This allows for said front differential device 30 to be made more compact than would otherwise be the case, since said front differential device 30 is now not required to be able to sustain sudden very high torque loads as heretofore has been necessary. Further, the durability of said front differential device 30 is enhanced, and also the durability of the front propeller shaft assembly including the universal joints 25 and 27 and so on is improved. Further, vehicle controllability is enhanced. Also, according to the concept of the present invention, no particular driver action is required for this control of the center differential device 10, which is performed automatically. Further, slippage upon the road surface of the front vehicle wheels (which typically are the steering wheels for the vehicle) is restricted, and the running stability and the braking stability of the vehicle are enhanced. And also, since this torque transfer control device and method according to the present invention utilize the center differential device 10 and the clutch 21 incorporated therein which are already in any case provided to such a four wheel drive type transmission, hence the construction is relatively simple and the provision is economical.

Conclusion

It is acceptable, according to the principle of the present invention if, rather than a central differential device torque transfer control clutch such as the clutch 21 being provided, as was the case in the preferred embodiment disclosed above, alternatively some other such device is utilized, such as a center clutch having the appropriate torque transmitting capability, combined with a center differential. Other modifications could be conceived of. Therefore, although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. A four wheel drive power transmission for a vehicle with an engine, a front wheel propeller shaft, and a rear wheel propeller shaft, comprising a center differential device for distributing rotational power supplied from said engine to said front wheel propeller shaft and said rear wheel propeller shaft at a variable torque dividing ratio therebetween, means for detecting the magnitude of torque of the rotational power supplied from said engine, and means for controlling said center differential device so as to vary the torque dividing ratio thereof according to the magnitude of torque detected by said torque detecting means, said torque dividing ratio being varied toward a decreased ratio for one of said front and rear wheel propeller shafts and an increased ratio for the other of said front and rear wheel propeller shafts as the magnitude of torque detected by said torque detecting means increases, so that the torque loaded on said one of said front and rear wheel propellar shafts is maintained not to exceed a determinate maximum value.

2. A four wheel drive power transmission according to claim 1, wherein said center differential device comprises a planetary gear mechanism including a sun gear, a ring gear, a carrier and a plurality of planetary pinions and adapted to receive the rotational power supplied from said engine by one of said sun gear, said ring gear and said carrier while driving said front wheel propeller shaft and said rear wheel propeller shaft by the remaining two of said sun gear, said ring gear and said carrier, respectively, and a clutch for connecting either two of said sun gear, said ring gear and said carrier at variable degrees.

3. A four wheel drive power transmission according to claim 2, wherein said clutch is a wet type clutch.

4. A four wheel drive power transmission according to claim 2, wherein the degree of engagement of said clutch is substantially uniformly reduced from a maximum value thereof as the magnitude of torque of the rotational power supplied from the engine increases from zero to a certain value.

* * * * *